United States Patent
Egger et al.

(10) Patent No.: US 12,321,733 B2
(45) Date of Patent: Jun. 3, 2025

(54) APPARATUS AND METHOD WITH NEURAL NETWORK COMPUTATION SCHEDULING

(71) Applicants: SAMSUNG ELECTRONICS CO., LTD., Suwon-si (KR); Seoul National University R&DB Foundation, Seoul (KR)

(72) Inventors: Bernhard Egger, Seoul (KR); Hyemi Min, Seoul (KR)

(73) Assignees: Samsung Electronics Co., Ltd., Suwon-si (KR); Seoul National University R&DB Foundation, Seoul (KR)

( * ) Notice: Subject to any disclaimer, the term of this patent is extended or adjusted under 35 U.S.C. 154(b) by 177 days.

(21) Appl. No.: 17/978,528

(22) Filed: Nov. 1, 2022

(65) Prior Publication Data
US 2023/0195439 A1    Jun. 22, 2023

(30) Foreign Application Priority Data
Dec. 22, 2021    (KR) .................. 10-2021-0185068

(51) Int. Cl.
*G06F 8/41*    (2018.01)
(52) U.S. Cl.
CPC .................... *G06F 8/452* (2013.01)
(58) Field of Classification Search
None
See application file for complete search history.

(56) References Cited

U.S. PATENT DOCUMENTS

| | | | | |
|---|---|---|---|---|
| 6,092,180 A | * | 7/2000 | Anderson | G06F 9/3836 |
| | | | | 712/216 |
| 6,877,086 B1 | * | 4/2005 | Boggs | G06F 9/3861 |
| | | | | 712/E9.05 |

(Continued)

FOREIGN PATENT DOCUMENTS

| | | | | | |
|---|---|---|---|---|---|
| CN | 108228242 B | * | 2/2020 | .......... | G06F 9/3802 |
| CN | 110764744 B | * | 12/2023 | ............... | G06F 8/37 |
| WO | WO-2022110567 A1 | * | 6/2022 | ............... | G06F 8/41 |

OTHER PUBLICATIONS

Zhang, Chen, et al. "Optimizing FPGA-based accelerator design for deep convolutional neural networks." *Proceedings of the 2015 ACM/SIGDA international symposium on field-programmable gate arrays.* Feb. 22, 2015. pp. 1-10.

(Continued)

*Primary Examiner* — Philip Wang
(74) *Attorney, Agent, or Firm* — NSIP Law

(57) ABSTRACT

An apparatus includes a processor configured to generate each of intermediate representation codes corresponding to each of a plurality of loop structures obtained that corresponds to a neural network computation based on an input specification file of hardware; schedule instructions included in each of the intermediate representation codes corresponding to the plurality of loop structures; select, based on latency values predicted according to scheduling results of the intermediate representation codes, any one code among the intermediate representation codes; and allocate, based on a scheduling result of the selected intermediate representation code, instructions included in the selected intermediate representation code to resources of the hardware included in the apparatus.

19 Claims, 12 Drawing Sheets

(56) References Cited

U.S. PATENT DOCUMENTS

| | | | |
|---|---|---|---|
| 10,579,584 B2 | 3/2020 | Vorbach et al. | |
| 10,664,310 B2 | 5/2020 | Bokhari et al. | |
| 10,691,430 B2 | 6/2020 | Pan et al. | |
| 10,740,674 B2 | 8/2020 | Ambrose et al. | |
| 10,838,910 B2 | 11/2020 | Zhang et al. | |
| 11,250,061 B1* | 2/2022 | Nama | G06N 3/084 |
| 2002/0083423 A1* | 6/2002 | Ostanevich | G06F 9/3826 |
| | | | 712/E9.046 |
| 2004/0158826 A1* | 8/2004 | Bliss | G06F 8/441 |
| | | | 717/151 |
| 2017/0039048 A1* | 2/2017 | Gschwind | G06F 8/452 |
| 2019/0138365 A1* | 5/2019 | Purnell | G06F 13/28 |
| 2021/0034344 A1* | 2/2021 | Caballero de Gea | G06F 8/447 |
| 2021/0240456 A1* | 8/2021 | Dwars | G06F 9/30174 |
| 2021/0241108 A1 | 8/2021 | Chai et al. | |
| 2021/0263766 A1 | 8/2021 | Dunajski et al. | |
| 2021/0279587 A1* | 9/2021 | Egger | G06F 9/5061 |
| 2021/0382700 A1* | 12/2021 | Watanabe | G06F 9/30038 |
| 2022/0012188 A1* | 1/2022 | Durham | G06F 21/79 |
| 2022/0138586 A1* | 5/2022 | Kim | G06N 3/10 |
| 2023/0140809 A1* | 5/2023 | Palop | G06N 20/00 |
| | | | 706/12 |
| 2024/0053980 A1* | 2/2024 | Stelmar Netto | G06F 8/71 |

OTHER PUBLICATIONS

Ma, Yufei, et al. "Optimizing loop operation and dataflow in FPGA acceleration of deep convolutional neural networks." *Proceedings of the 2017 ACM/SIGDA International Symposium on Field-Programmable Gate Arrays*. Feb. 22, 2017. pp. 1-6.

Li, Jiajun, et al. "SmartShuttle: Optimizing off-chip memory accesses for deep learning accelerators." *2018 Design, Automation & Test in Europe Conference & Exhibition (Date)*. IEEE, Apr. 23, 2018. pp. 343-348.

Korean Office Action issued on Dec. 17, 2024, in counterpart Korean Patent Application No. 10-2021-0185068 (3 pages in English, 6 pages in Korean).

* cited by examiner

1 LOAD M0 ← I1
2 LOAD M1 ← W1
3 LOAD M2 ← W2
4 LOAD M3 ← I1, W1  dep: 2
5 LOAD M4 ← I1, W2  dep: 3
6 STORE O1 ← M3     dep: 4
7 STORE O2 ← M4

FIG. 5

APPARATUS AND METHOD WITH NEURAL NETWORK COMPUTATION SCHEDULING

CROSS-REFERENCE TO RELATED APPLICATIONS

This application claims the benefit under 35 USC § 119(a) of Korean Patent Application No. 10-2021-0185068, filed on Dec. 22, 2021, in the Korean Intellectual Property Office, the entire disclosure of which is incorporated herein by reference for all purposes.

BACKGROUND

1. Field

The following description relates to an apparatus and method with neural network computation scheduling.

2. Description of Related Art

A convolutional neural network (CNN) is widely used in artificial intelligence (AI) applications, such as image recognition and detection. While the accuracy of the CNN has improved, a size of a network, the number of operations, and memory usage are rapidly increasing to improve accuracy and execution speed. CNN may have a large network size and abundant data movement (e.g., data loading and storage). Such abundant data movement may need large amounts of processing time, and even though data movement may be reduced, hardware utilization may be low, thereby increasing latency. Such issues may occur in neural network accelerators for CNN computation processing.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an apparatus includes a processor configured to generate each of intermediate representation codes corresponding to each of a plurality of loop structures obtained that corresponds to a neural network computation based on an input specification file of hardware; schedule instructions included in each of the intermediate representation codes corresponding to the plurality of loop structures; select, based on latency values predicted according to scheduling results of the intermediate representation codes, any one code among the intermediate representation codes; and allocate, based on a scheduling result of the selected intermediate representation code, instructions included in the selected intermediate representation code to resources of the hardware included in the apparatus.

The plurality of loop structures may be determined based on a combination of a plurality of tiling sizes and a plurality of dataflows.

For obtaining the plurality of loop structures, the processor may be further configured to: obtain a plurality of tiling sizes and a plurality of dataflows corresponding to the neural network computation; prune the plurality of obtained tiling sizes based on the input specification file; and obtain the plurality of loop structures corresponding to combinations of the pruned tiling sizes and the plurality of data flows.

For the pruning of the plurality of obtained tiling sizes, the processor may be further configured to: remove, based on a size of a computing array comprised in the input specification file, a computing tiling size not corresponding to the size of the computing array; and remove, based on a constraint condition of a tiling direction comprised in the input specification, a direction tiling size corresponding to a direction corresponding to a constraint condition.

For the generating of each of the intermediate representation codes, for each loop structure, the processor may be further configured to: generate, based on a dependency relationship between data comprised in a corresponding loop structure, an intermediate representation code corresponding to the corresponding loop structure.

For the scheduling of the instructions, the processor may be further configured to schedule the instructions based on a list scheduling algorithm.

For the allocating of the resources of the hardware, the processor may be further configured to allocate data, to a memory, corresponding to instructions included in the selected intermediate representation code based on a linear allocator.

The input specification file of the hardware may include information associated with a structure of a computing array of the hardware included in the apparatus.

The neural network computation may include a convolutional operation performed by a convolutional layer of a convolutional neural network (CNN).

In another general aspect, a method includes generating each of intermediate representation codes corresponding to each of a plurality of loop structures obtained that corresponds to a neural network computation based on an input specification file of hardware; scheduling instructions included in each of the intermediate representation codes corresponding to the plurality of loop structures; selecting, based on latency values predicted according to scheduling results of the intermediate representation codes, any one code among the intermediate representation codes; and allocating, based on a scheduling result of the selected intermediate representation code, the instructions included in the selected intermediate representation codes to resources of the hardware included in an apparatus.

The plurality of loop structures may be determined based on a combination of a plurality of tiling sizes and a plurality of dataflows.

The obtaining of the plurality of loop structures may include obtaining a plurality of tiling sizes and a plurality of dataflows corresponding to the neural network computation; pruning the plurality of obtained tiling sizes based on the input specification file; and obtaining the plurality of loop structures corresponding to combinations of the pruned tiling sizes and the plurality of data flows.

The pruning of the plurality of obtained tiling sizes may include removing, based on a size of a computing array comprised in the input specification file of the hardware, a computing tiling size not corresponding to the size of the computing array, and removing, based on a constraint on a tiling direction comprised in the input specification file, a direction tiling size corresponding to a direction corresponding to a constraint condition.

For each loop structure, the generating of the intermediate representation codes may include generating, based on a dependency relationship between data comprised in a corresponding loop structure, an intermediate representation code corresponding to the corresponding loop structure.

The scheduling of the instructions may include scheduling the instructions based on a list scheduling algorithm.

The allocating of the resources of the hardware may include allocating data, to a memory, corresponding to instructions included in the selected intermediate representation codes based on a linear allocator.

The input specification file of the hardware may include information associated with a structure of a computing array of the hardware included in the apparatus.

The neural network computation may include a convolutional operation performed by a convolutional layer of a convolutional neural network (CNN).

The hardware may include a convolutional neural network (CNN) accelerator configured to perform a convolutional operation.

Other features and aspects will be apparent from the following detailed description, the drawings, and the claims.

BRIEF DESCRIPTION OF THE DRAWINGS

FIG. 5 illustrates an example of an intermediate representation code.

Figure 1:
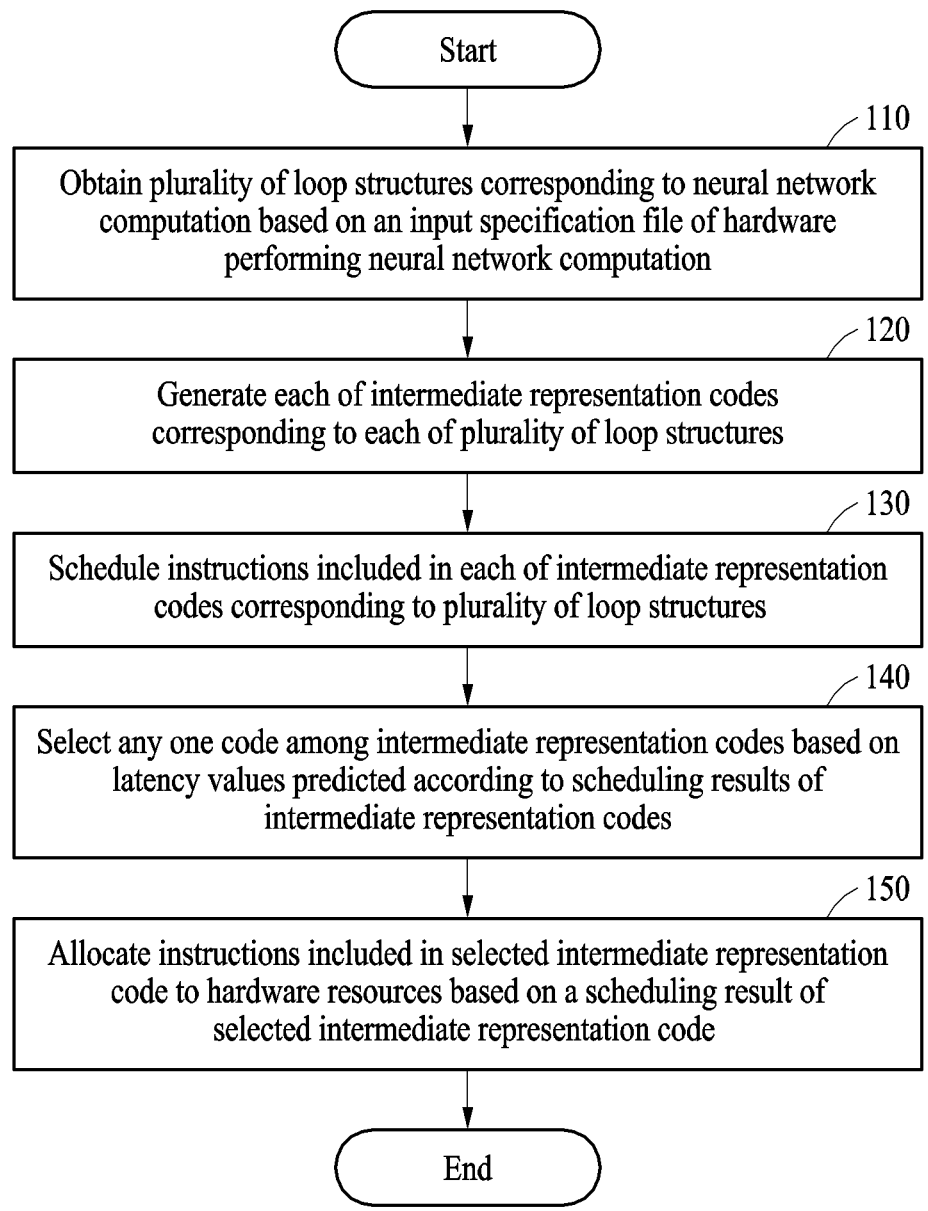
FIG. 1 illustrates an example of operations of a neural network computation scheduling method.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

Unless otherwise defined, all terms used herein including technical or scientific terms have the same meanings as those generally understood consistent with and after an understanding of the present disclosure. Terms, such as those defined in commonly used dictionaries, should be construed to have meanings matching with contextual meanings in the relevant art and the present disclosure, and are not to be construed as an ideal or excessively formal meaning unless otherwise defined herein.

FIG. 1 illustrates an example of operations of a neural network computation scheduling method.

Referring to FIG. 1, the scheduling method of a neural network computation may include obtaining a plurality of loop structures corresponding to the neural network computation based on an input specification file of hardware in operation 110, generating intermediate representation codes corresponding to each of the plurality of loop structures in operation 120, scheduling instructions included in each intermediate representation code corresponding to the plurality of loop structures in operation 130, selecting any one code among the intermediate representation codes based on latency values predicted based on the scheduling of the intermediate representation codes in operation 140, and allocating instructions included in the intermediate representation codes to resources of hardware included in an apparatus, based on the scheduling of the selected intermediate representation code in operation 150. The scheduling method may be performed by at least one processor of an apparatus for performing a neural network computation. A hardware structure of the apparatus for performing a neural network computation is described in detail below.

A neural network computation may include a convolutional operation performed by a convolutional layer of a convolutional neural network (CNN), and hardware for performing the neural network computation may include a CNN accelerator for performing a convolutional operation.

Figure 2:
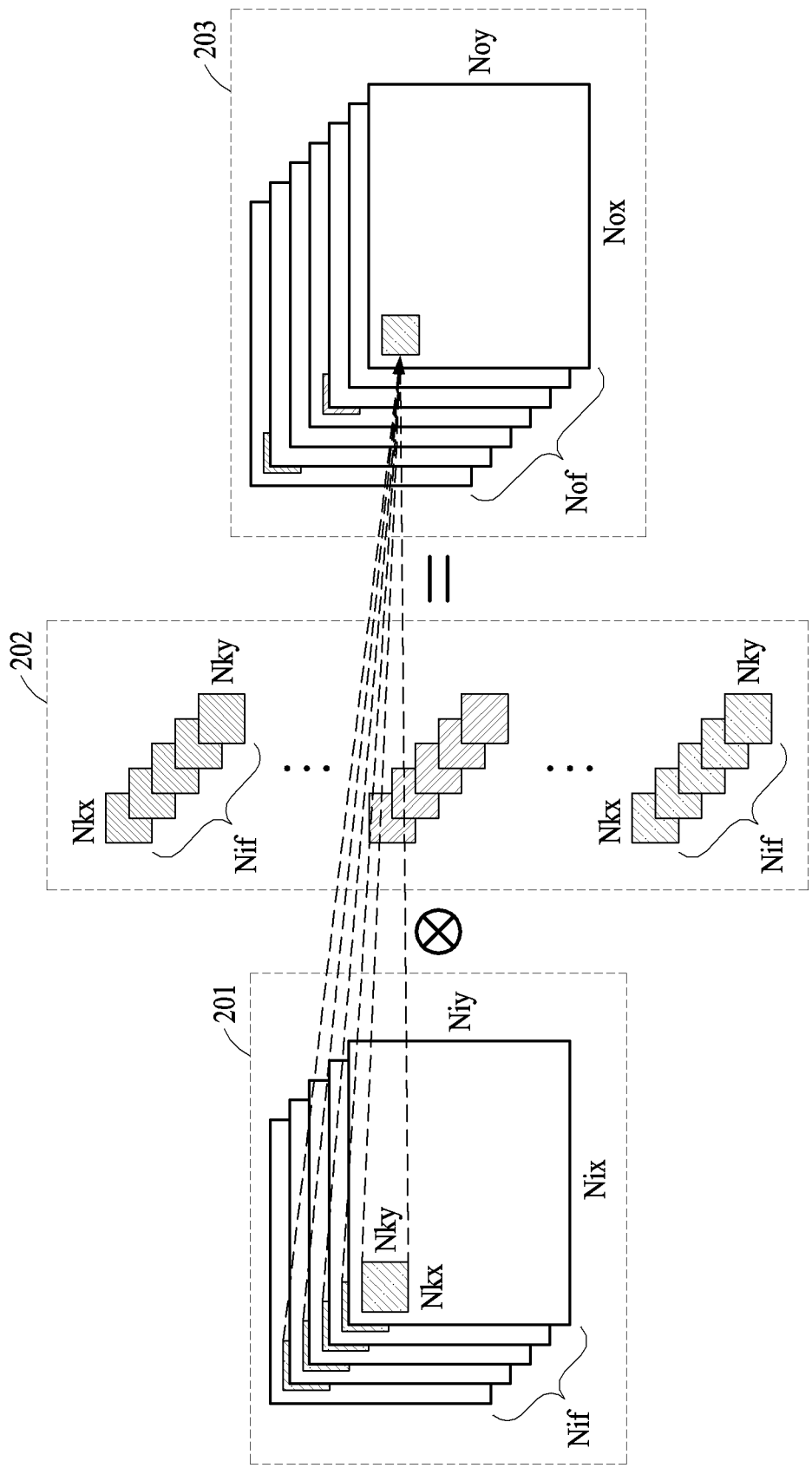
FIG. 2 illustrates an example of a loop structure of an operation performed in a convolutional layer.

Operation 110 may include obtaining a plurality of loop structures corresponding to the neural network computation based on a tiling size and a data flow. A loop structure may include at least one instruction for performing a computation corresponding to a layer included in the neural network. For example, referring to FIG. 2, a computation of a convolutional layer calculating an output feature map 203 of Nof×Nox×Noy based on kernel maps 202 of Nif×Nkx×Nky from an input feature map 201 of Nif×Nix×Niy may correspond to a loop structure as represented by Equation 1.

$$\begin{aligned}
&\text{for } (no = 0; no < Nof; no++) \quad &\text{Equation 1}\\
&\quad \left.\begin{aligned}&\text{for } (y = 0; y < Noy; y = +S)\\&\text{for } (x = 0; x < Nox; x = +S)\end{aligned}\right\}\\
&\qquad \text{for } (ni = 0; ni < Nif; ni++)\\
&\qquad\quad \left.\begin{aligned}&\text{for } (ky = 0; ky < Nky; ky++)\\&\text{for } (kx = 0; kx < Nkx; kx++)\end{aligned}\right\}\\
&\text{pixel}_L(no; x, y) \mathrel{+}= \text{pixel}_{L-1}(ni; x+kx, y+ky) \times \text{weight}_{L-1}(ni, no; kx, ky);\\
&\text{pixel}_L(no; x, y) = \text{pixel}_L(no; x, y) + \text{bias}(no);
\end{aligned}$$

In Equation 1, L denotes an index of a convolutional layer, and S denotes a stride.

A loop structure may be determined by combining a data flow and a tiling size. In other words, the plurality of loop structures may be determined based on the combination of a plurality of data flows and a plurality of tiling sizes.

Figure 3:
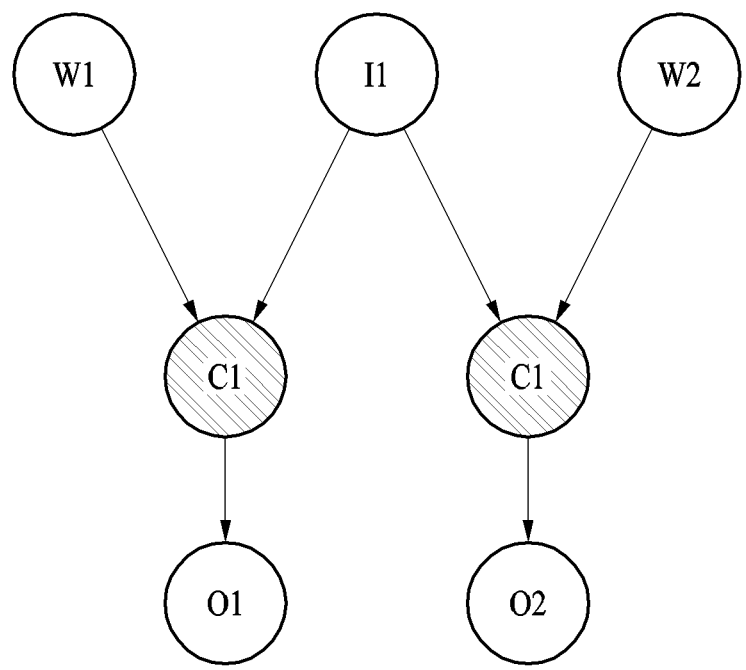
FIG. 3 illustrates an example of a partial data flow of a convolutional layer of a convolutional neural network (CNN).

A data flow may represent a flow of data for a computation and may include a dependency relationship and a parallel relationship between data for the computation. For example, some data flows of the convolutional layer of the CNN may be represented, as illustrated in FIG. 3. Referring to FIG. 3, a convolutional operation may be performed on I1 with each of W1 and W2; thus, O1 and O2 may be obtained. O1 and O2 may correspond to data dependent on I1, W1, and W2, and I1, W1, and W2 may correspond to data in a parallel relationship with each other.

Figure 4A:
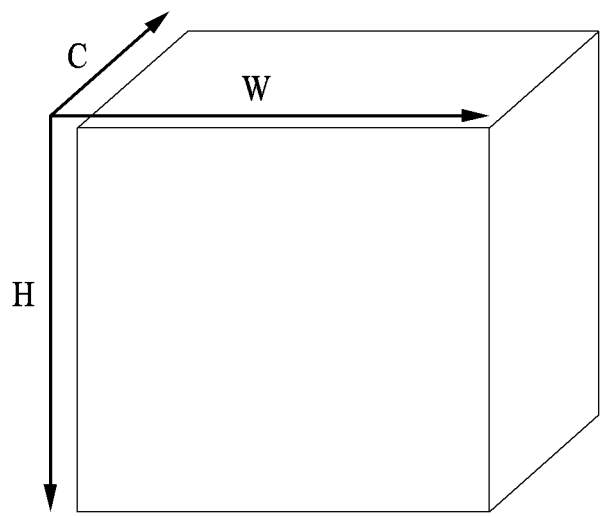
FIGS. 4A to 4F illustrate examples of tiling.
Figure 4B:
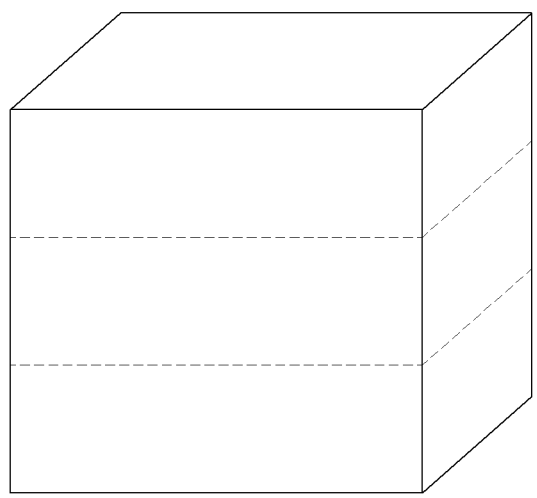
Figure 4C:
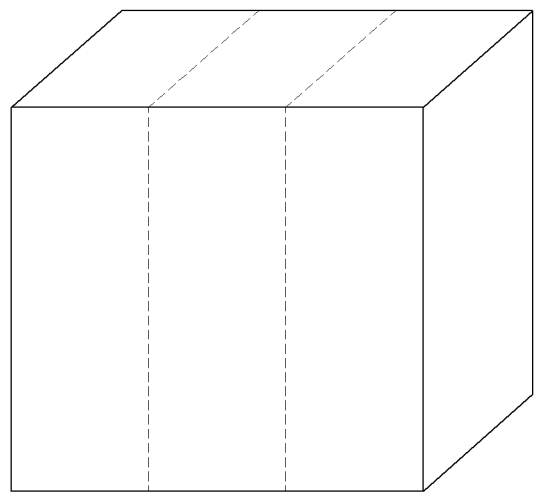
Figure 4D:
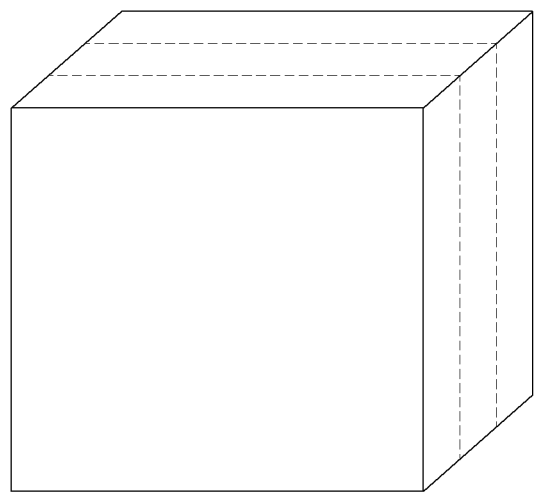
Figure 4E:
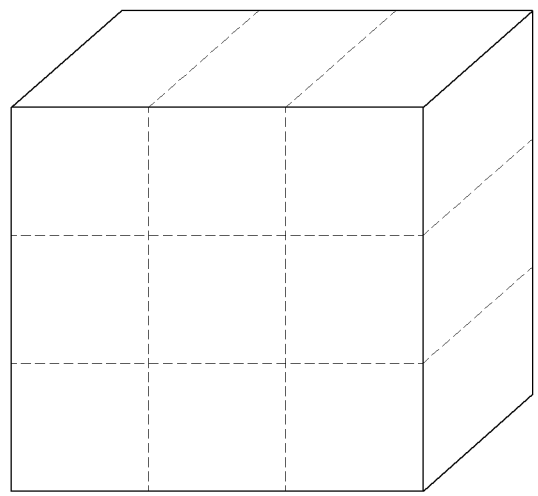
Figure 4F:
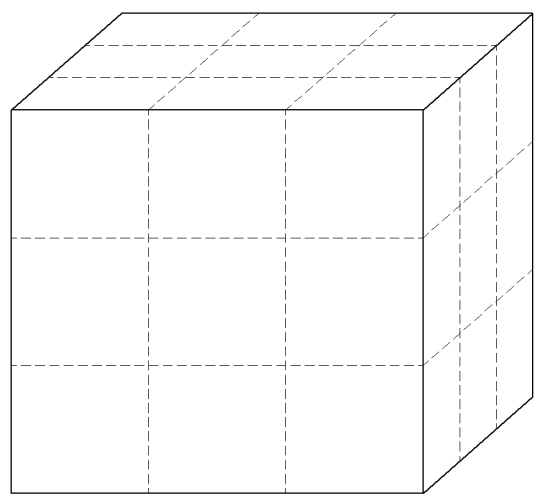

Generally, an operation of loading data from external memory (e.g., dynamic random-access memory (DRAM)) or storing data in the external memory may correspond to an operation that takes a longer time than an operation of loading data from an internal buffer (e.g., static random-access memory (SRAM)) or storing data in the internal buffer. Since hardware that performs the neural network computation has a relatively small internal buffer to minimize using limited resources and latency, there may be a case in which all input/output data of one neural network computation layer is not loadable in the internal buffer. Tiling may be a method of loading only a portion of the input/output data of a neural network layer into the internal buffer (e.g., SRAM) of the hardware such that a neural network computation is implemented in hardware with limited memory capacity and partially generating computation results to store the results in a memory (e.g., DRAM). Tiling may be performed in each axis direction of multidimensional output data in the neural network computation. For example, when an input of the convolutional layer of the CNN is 3D data (e.g., height H×width W×column C), tiling may be performed in at least one of an H direction, a W direction, and a C direction. For example, referring to FIGS. 4A through 4F, FIG. 4A illustrates a tiling result corresponding to each axis (e.g., an H axis, a W axis, and a C axis) of three-dimensional (3D) data, FIG. 4B illustrates a result in which tiling is performed in an H direction, FIG. 4C illustrates a result in which tiling is performed in a W direction, FIG. 4D illustrates a result in which tiling is performed in a C direction, FIG. 4E illustrates a result in which dual tiling is performed in the H and W directions, and FIG. 4F illustrates a result in which triple tiling is performed in the H, W, and C directions. The computation by a large neural network may be implemented in hardware through the tiling.

The loop structure may include a repeated operation for blocks, including data partially divided based on the tiling. Data, on which an operation is performed, may be determined differently based on a tiling size in the loop structure, and an operation order may be determined based on a different data flow.

The loop structure may be determined based on a hardware specification file. The hardware specification file may include information associated with hardware resources or computing resources for performing neural network computations. For example, the hardware specification file may include information associated with a structure of a computing array, including at least one processing element (PE) (e.g., the number of PEs, a size of a PE array, etc.). The computing array may correspond to, for example, a systolic array.

Operation 110 may include an operation of obtaining a plurality of tiling sizes and a plurality of data flows corresponding to the neural network computation, pruning the plurality of obtained tiling sizes based on the hardware specification file, and obtaining a plurality of loop structures corresponding to a combination of the pruned tiling sizes and the plurality of data flows.

Pruning the plurality of tiling sizes may be for excluding a tiling size determined to be inefficient to perform a computation among the plurality of tiling sizes. For example, the pruning of the plurality of tiling sizes may include any one of removing a tiling size not corresponding to a size of the computing array based on a size of a computing array included in the hardware specification file and removing a tiling size corresponding to a direction corresponding to a constraint condition based on the constraint condition for a tiling direction included in the hardware specification file.

A tiling size among the plurality of tiling sizes obtained in operation 120 not corresponding to a size of the computing array of H×W included in the hardware specification file may be removed. For example, a tiling size exceeding H or W, or a tiling size not corresponding to a divisor of H or W may be determined as an inefficient tiling size to be performed in hardware and may be removed.

The hardware specification file may further include information limiting a tiling direction. For example, when the input of the convolutional layer of the CNN is 3D data of height H×width W×column C, information limiting at least one of H direction tiling, W direction tiling, and C direction tiling may be included. When the hardware specification file includes information limiting the tiling direction, the tiling size, in which the tiling in the corresponding direction is performed, may be removed.

A portion of the tiling size may be removed by pruning the tiling size, and since the loop structure is determined based on the tiling size, the number of obtained loop structures may be reduced. To be described hereinafter, a scheduling method may measure a latency based on the scheduling result of intermediate representation codes corresponding to the obtained loop structures, respectively, and thus, when the number of loop structures is reduced, the time consumed by the scheduling may be reduced.

Operation 120 may correspond to an operation of generating an intermediate representation code corresponding to each of the plurality of loop structures obtained in operation 110. The intermediate representation code may be a data structure or code used internally by a compiler or virtual machine to represent source code. The intermediate representation code may correspond to the loop structure. For example, a first intermediate representation code corresponding to a first loop structure and a second intermediate representation code corresponding to a second loop structure may include different combinations of instructions. In other words, the intermediate representation code may include at least one instruction or a combination of a plurality of instructions for operating a corresponding loop structure.

An operation of generating the intermediate representation code in operation 120 may include an operation of generating an intermediate representation code corresponding to the corresponding loop structure based on a dependency relationship between data included in the loop structure. The intermediate representation code may be generated by reflecting the dependency relationship and a parallel relationship between data included in the loop structure. For example, referring to FIG. 5, an intermediate representation code may be generated such that an instruction (first to third lines) loading I1, W1, and W2, I1 and W1, an instruction (fourth and fifth lines) performing a convolutional operation on I1 and W2, and an instruction (sixth and seventh lines) storing O1 and O2 of the convolutional operation are performed beforehand based on the parallel relationship between W1 and W2 and the dependency relationship between W1 and W2 and O1 and O2.

Operation 130 may correspond to an operation of scheduling instructions included in each of the intermediate representation codes corresponding to the plurality of loop structures obtained in operation 120. Scheduling may be allocating instruction(s) to hardware resources to execute the instruction(s) included in the intermediate representation code, and scheduling may correspond to instruction scheduling performed by a compiler. For example, operation 130 (e.g., an operation of scheduling) may include scheduling instructions based on a list scheduling algorithm.

The list scheduling algorithm may be a method of allocating ordered tasks to m devices based on a greedy algorithm. The list scheduling algorithm may be a method of detecting a device that may implement a high-priority task and may be a method of repeating a process of allocating an operation in a device when the device is detected and detecting a device that may implement a task having a next priority when the device is not detected.

Operation 140 may include an operation of obtaining a latency value of each intermediate representation code based on the scheduling result for each of the intermediate representation codes in operation 130 and may include selecting any one of the intermediate representation codes based on the obtained latency values among the intermediate representation codes. The latency values of the intermediate representation codes may be the time consumed to execute the instruction(s) included in the intermediate representation code using hardware resources. When an idle time delays an instruction to be executed, a latency value may be calculated to be large. For example, the latency of each intermediate representation code may be predicted using a model that outputs the latency corresponding to the instructions.

Operation 140 may include an operation of selecting the intermediate representation code corresponding to the lowest latency value among the plurality of intermediate representation codes by comparing the value of the predicted latency corresponding to each of the plurality of intermediate representation codes. In other words, the intermediate representation code having the smallest latency value among the plurality of intermediate representation codes may be selected in operation 140.

Operation 150 may include an operation of allocating instructions included in the intermediate representation code to resources of the hardware based on the scheduling of the intermediate representation code selected in operation 140.

Operation 150 may include an operation of allocating data corresponding to instructions included in the selected intermediate representation code to a memory based on a linear allocator. The linear allocator may be a pointer pointing to a start of an allocator, a pointer pointing to a first free address of the memory, and a memory allocator with a pointer pointing to a total size of the allocator. Data corresponding to the instructions may be allocated in the memory of the hardware based on the linear allocator. Data corresponding to the instructions may be data indicated by the instructions, for example, the data may be allocated to the memory based on the instruction requesting the load of corresponding data.

Figure 6A:
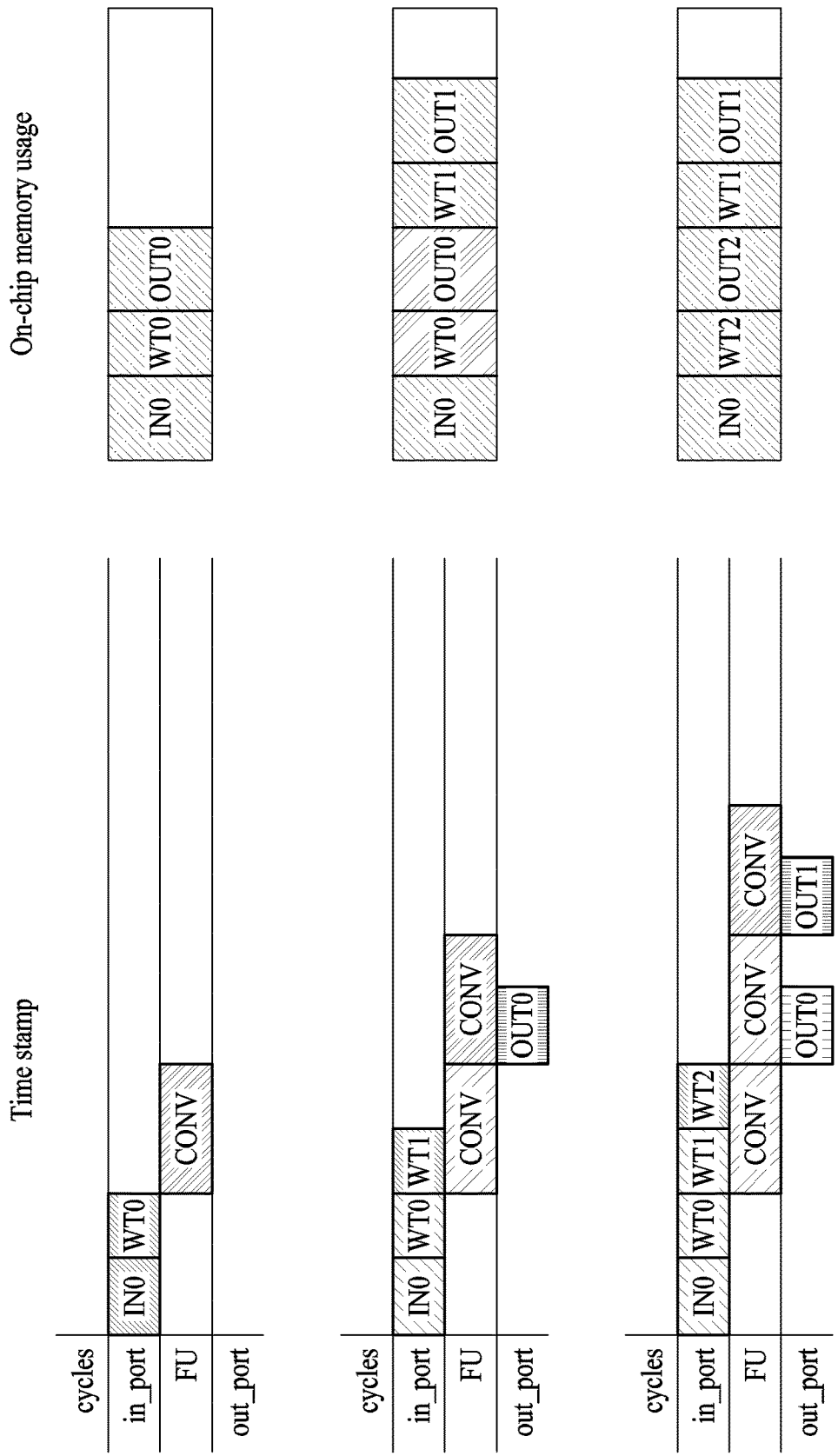
FIG. 6A illustrates an example of a scheduling result based on a scheduling method.
Figure 6B:
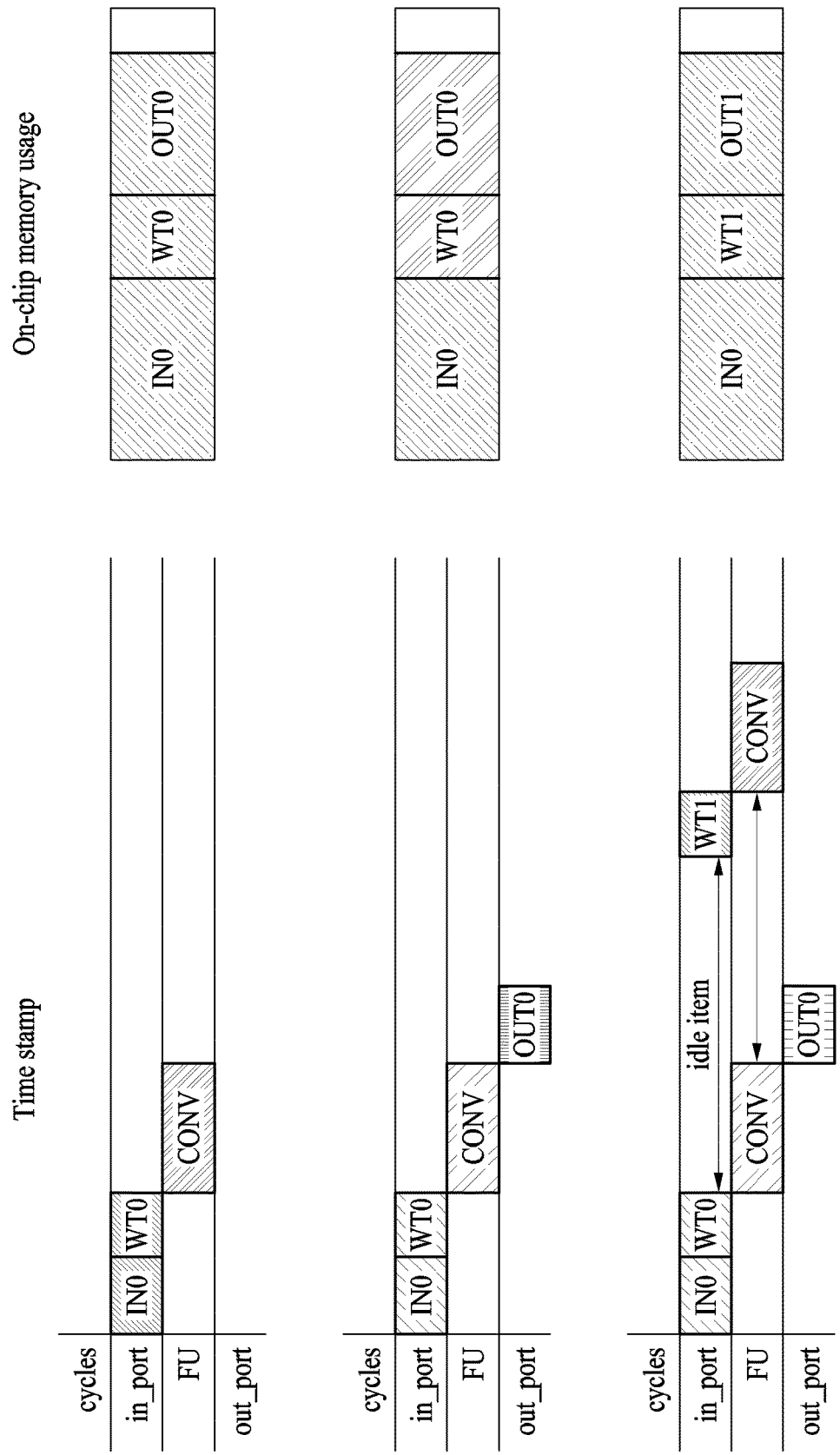
FIG. 6B illustrates an example of comparing a scheduling result based on a performance modeling-based scheduling method with a scheduling method.

FIG. 6A illustrates an example of a scheduling result based on a scheduling method. FIG. 6B illustrates an example of a scheduling result based on a performance modeling-based scheduling method for comparing with a scheduling method.

FIGS. 6A and 6B illustrate a Gantt chart and on-chip memory usage of a process of performing a convolutional operation of input data IN0 and a weight WT0 and a convolutional operation of IN0 and a weight WT1. The on-chip memory may correspond to an internal buffer of a device that performs a neural network computation.

FIG. 6A illustrates a scheduling result of an instruction corresponding to a loop structure having a small tiling size selected considering a latency value based on a scheduling method. Referring to the on-chip memory usage illustrated in FIG. 6A, after performing the convolutional operation on input data IN0 and a weight WT0, input/output data of a small size corresponding to the small tiling size may be stored in the on-chip memory, and input/output data for the convolutional operation that is a next operation on the input data IN0 and the weight WT0 may be directly loaded. Thus, referring to the Gantt chart, an operation result stored in the on-chip memory may be stored in external memory, and a convolutional operation of IN0 and weight WT1 may be performed without additional idle time for resetting the on-chip memory.

Meanwhile, FIG. 6B illustrates a scheduling result of an instruction corresponding to a loop structure of a large tiling size that may maximally utilize a memory capacity based on a performance modeling-based scheduling method for maximally using the memory capacity. Referring to the on-chip memory usage illustrated in FIG. 6B, after performing the convolutional operation on IN0 and weight WT0, a tiling size having the maximum capacity of the on-chip memory may be selected, and the next operation may not be performed immediately because there is no free space to perform the next operation. Therefore, referring to the Gantt chart, a separate idle time may be needed to store the operation result stored in the on-chip memory in an external memory and reset the on-chip memory.

An execution time of the same operation may be reduced based on the scheduling method when the Gantt charts illustrated in FIGS. 6A and 6B are compared to each other.

Figure 7:
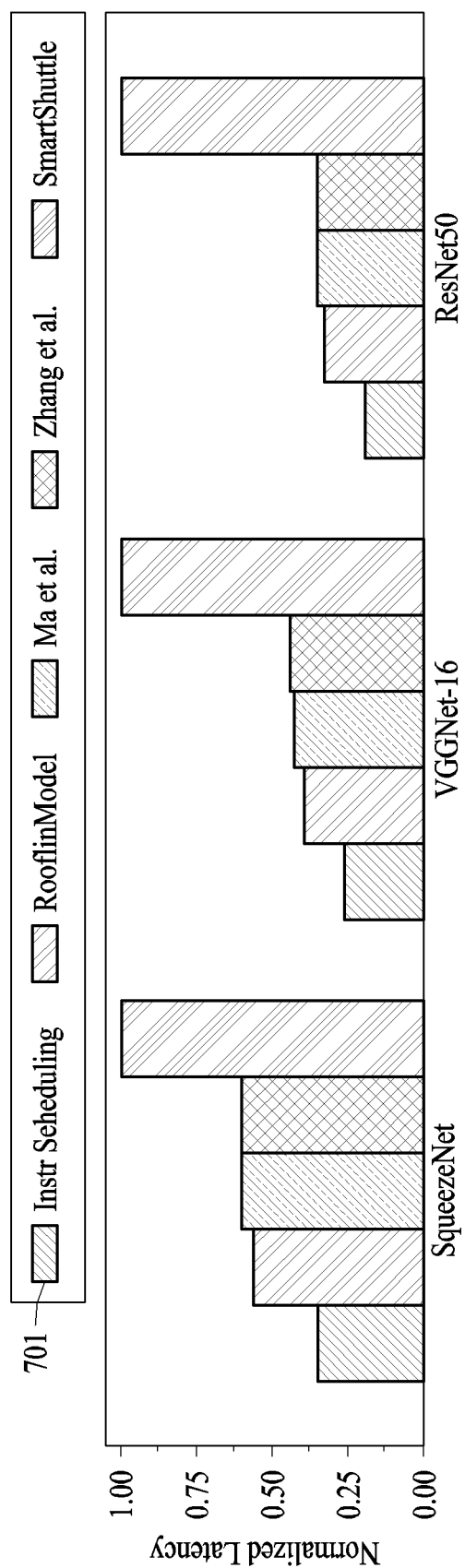
FIG. 7 illustrates an example of a graph comparing a latency result of a scheduling method and other known methods.

FIG. 7 illustrates an example of a graph comparing a latency result of a scheduling method and other known methods.

Referring to FIG. 7, when comparing a latency value measured as a result of performing an operation using a scheduling method 701 corresponding to each of the three neural networks to latency values measured as a result of performing an operation using other known methods (e.g., RoofModel, Ma et al., Zhang et al. and SmartShuttle), latency is smaller when the scheduling method 701 is used.

Figure 8:
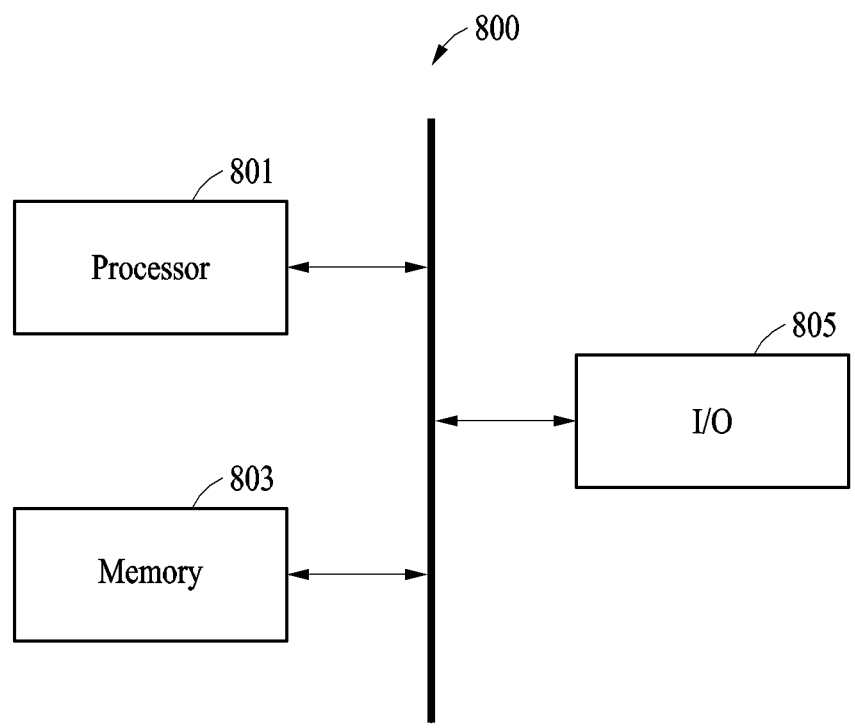
FIG. 8 illustrates an example of a structure of an apparatus for performing a scheduling method.

FIG. 8 illustrates an example of a structure of an apparatus for performing a scheduling method.

Referring to FIG. 8, an apparatus 800 may include a processor 801, a memory 803, and an input/output (I/O) device 805. The apparatus 800 may include an apparatus for performing the scheduling method described above with reference to FIGS. 1 to 7. For example, the apparatus 800 may include a neural network accelerator for performing a neural network operation, and a structure of the neural network accelerator for performing the scheduling method is described in detail below.

The processor 801 may perform at least one of the methods described with reference to FIGS. 1 to 7. For example, the processor 801 may obtain a plurality of loop structures corresponding to the neural network computation based on an input specification file of a hardware, generate intermediate representation codes corresponding to each of the plurality of loop structures, schedule instructions included in each intermediate representation code corresponding to the plurality of loop structures, select any one code among the intermediate representation codes based on latency values predicted based on the scheduling of the intermediate representation codes, and allocate the instructions included in the intermediate representation codes to resources of hardware included in the apparatus based on the scheduling of the selected intermediate representation code.

The memory 803 may be a volatile memory or a non-volatile memory and may store data related to the scheduling method described above with reference to FIGS. 1 to 7. For example, the memory 803 may store data generated by the process of performing the scheduling method described above or data needed to perform the scheduling method described above. For example, the memory 803 may store loop structures and intermediate representation codes corresponding to the loop structures and may store a scheduling result of the selected intermediate representation code.

The apparatus 800 may exchange data with an external device (e.g., a terminal, server, or network of a user) through the I/O device 805 or receive data from a user or provide data to the user. For example, the apparatus 800 may receive a hardware specification file and a neural network as input data for performing the scheduling method through the I/O device 805 and may allocate an instruction that is an output of performing the scheduling method to a hardware resource.

The memory 803 may store a program in which the scheduling method described above with reference to FIGS. 1 to 7 is implemented. The processor 801 may execute the program stored in the memory 803 and may control the apparatus 800. Code of the program executed by the processor 801 may be stored in the memory 803.

The apparatus 800 may further include other components (not shown). For example, the apparatus 800 may further include a communication module that provides a function for communicating with another electronic device or another server through a network. In addition, the apparatus 800 may further include other components such as a transceiver, various sensors, a database, and the like.

Figure 9:
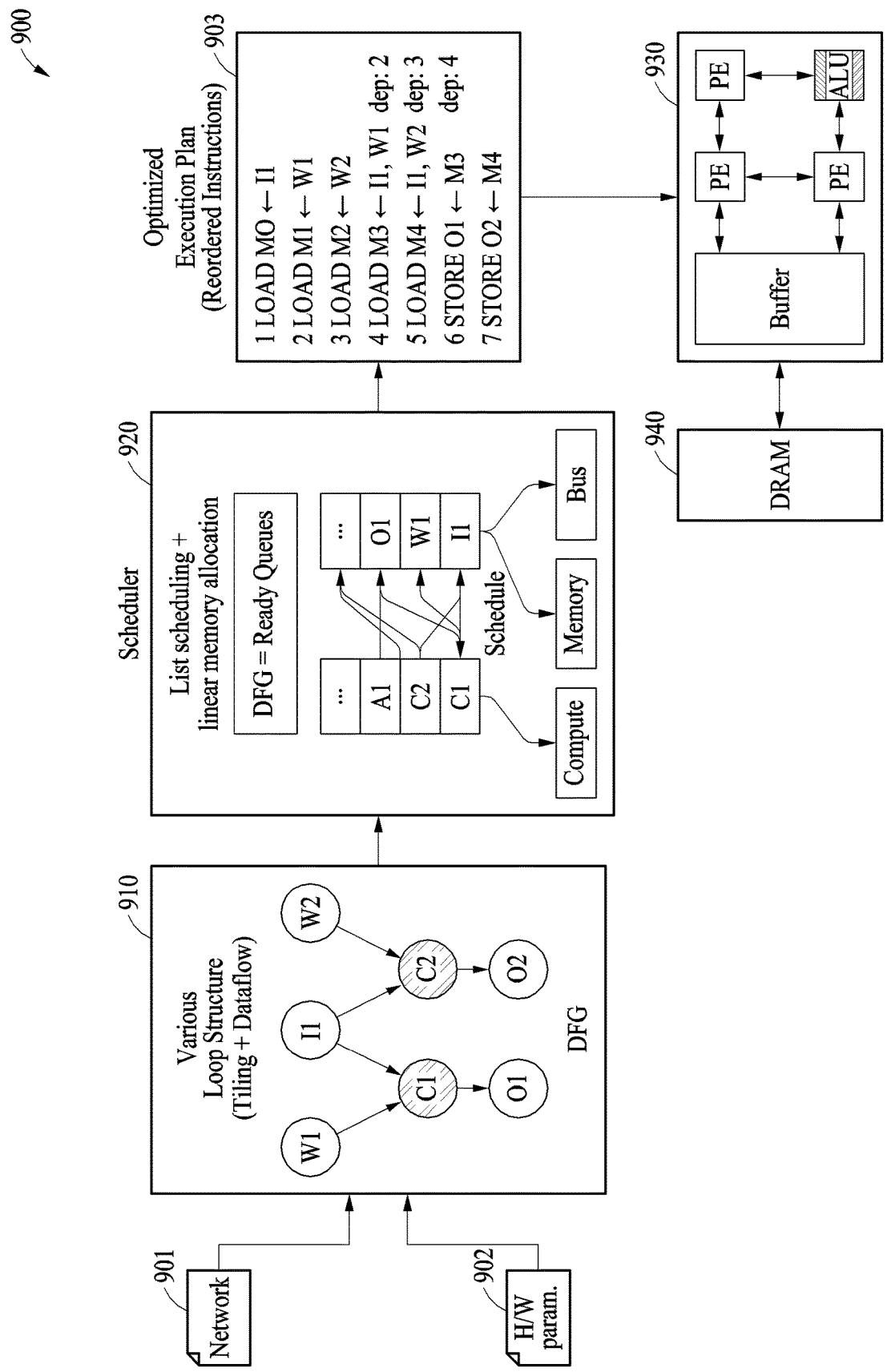
FIG. 9 illustrates an example of a structure of an accelerator in a neural network performing a scheduling method.

FIG. 9 illustrates an example of a structure of an accelerator in a neural network performing a scheduling method.

Referring to FIG. 9, a neural network accelerator 900 may include a module 910 for obtaining a plurality of loop structures based on a neural network 901 and a hardware specification file 902, a scheduler module 920 for scheduling instructions of intermediate representation codes corresponding to each of the plurality of loop structures for outputting a scheduling result 903 of optimal intermediate representation code, and a module 930 for executing an instruction using hardware resources based on the scheduling result 903.

The module 910 may perform operation 110 of the scheduling method described above with reference to FIG. 1, and the scheduler module 920 may perform operations 120 to 140 of the scheduling method described with reference to FIG. 1. The scheduling result 903 may correspond to a scheduling result of an intermediate code representation having the smallest latency value. The module 930 may use hardware resources to execute instructions included in the intermediate representation code based on the scheduling result 903.

The module 930 may include an internal buffer and at least one PE and may access a DRAM memory 940 outside the module 930. The hardware specification file 902 may include information associated with the structure of PEs of the module 930 (e.g., information indicating that a size of a PE array is 2×2).

The accelerator, apparatus, processor, memory, input/output (I/O) device, neural network accelerator, module, scheduler module, module, apparatus 800, processor 801, memory 803, input/output (I/O) device 805, neural network accelerator 900, module 910, scheduler module 920, and module 930 in FIGS. 1-9 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus, the apparatus comprising:
a processor configured to:
generate each of intermediate representation codes corresponding to each of a plurality of loop structures obtained that corresponds to a neural network computation based on an input specification file of hardware;
schedule instructions included in each of the intermediate representation codes corresponding to the plurality of loop structures;
select, based on latency values predicted according to scheduling results of the intermediate representation codes, any one code among the intermediate representation codes; and
allocate, based on a scheduling result of the selected intermediate representation code, instructions included in the selected intermediate representation code to resources of the hardware included in the apparatus,
wherein the plurality of loop structures is determined based on a combination of a plurality of tiling sizes and a plurality of dataflows.

2. An apparatus, the apparatus comprising:
a processor configured to:
generate each of intermediate representation codes corresponding to each of a plurality of loop structures obtained that corresponds to a neural network computation based on an input specification file of hardware;
schedule instructions included in each of the intermediate representation codes corresponding to the plurality of loop structures;
select, based on latency values predicted according to scheduling results of the intermediate representation codes, any one code among the intermediate representation codes; and
allocate, based on a scheduling result of the selected intermediate representation code, instructions included in the selected intermediate representation code to resources of the hardware included in the apparatus,
wherein the processor is further configured to determine the plurality of loop structures based on a combination of a plurality of tiling sizes and a plurality of dataflows.

3. The apparatus of claim 1, wherein, for obtaining the plurality of loop structures, the processor is further configured to:
obtain the plurality of tiling sizes and the plurality of dataflows corresponding to the neural network computation;
prune the plurality of obtained tiling sizes based on the input specification file; and
obtain the plurality of loop structures corresponding to combinations of the pruned tiling sizes and the plurality of data flows.

4. The apparatus of claim 3, wherein, for the pruning of the plurality of obtained tiling sizes, the processor is further configured to:
remove, based on a size of a computing array comprised in the input specification file, a computing tiling size not corresponding to the size of the computing array; and
remove, based on a constraint condition of a tiling direction comprised in the input specification, a direction tiling size corresponding to a direction corresponding to a constraint condition.

5. The apparatus of claim 1, wherein, for the generating of each of the intermediate representation codes, for each loop structure, the processor is further configured to:
generate, based on a dependency relationship between data comprised in a corresponding loop structure, an intermediate representation code corresponding to the corresponding loop structure.

6. The apparatus of claim 1, wherein, for the scheduling of the instructions, the processor is further configured to schedule the instructions based on a list scheduling algorithm.

7. The apparatus of claim 1, wherein, for the allocating of the resources of the hardware, the processor is further configured to allocate data, to a memory, corresponding to instructions included in the selected intermediate representation code based on a linear allocator.

8. The apparatus of claim 1, wherein the input specification file of the hardware comprises:
information associated with a structure of a computing array of the hardware included in the apparatus.

9. The apparatus of claim 1, wherein the neural network computation comprises:
a convolutional operation performed by a convolutional layer of a convolutional neural network (CNN).

10. A processor-implemented scheduling method, comprising:
generating each of intermediate representation codes corresponding to each of a plurality of loop structures obtained that corresponds to a neural network computation based on an input specification file of hardware;
scheduling instructions included in each of the intermediate representation codes corresponding to the plurality of loop structures;
selecting, based on latency values predicted according to scheduling results of the intermediate representation codes, any one code among the intermediate representation codes; and
allocating, based on a scheduling result of the selected intermediate representation code, the instructions included in the selected intermediate representation codes to resources of the hardware included in an apparatus,
wherein the plurality of loop structures is determined based on a combination of a plurality of tiling sizes and a plurality of dataflows.

11. The scheduling method of claim 10, wherein the obtaining of the plurality of loop structures comprises:
obtaining the plurality of tiling sizes and the plurality of dataflows corresponding to the neural network computation;
pruning the plurality of obtained tiling sizes based on the input specification file; and
obtaining the plurality of loop structures corresponding to combinations of the pruned tiling sizes and the plurality of data flows.

12. The scheduling method of claim 11, wherein the pruning of the plurality of obtained tiling sizes comprises:
removing, based on a size of a computing array comprised in the input specification file of the hardware, a computing tiling size not corresponding to the size of the computing array; and
removing, based on a constraint on a tiling direction comprised in the input specification file, a direction tiling size corresponding to a direction corresponding to a constraint condition.

13. The scheduling method of claim 11, wherein for each loop structure, the generating of the intermediate representation codes comprises:
generating, based on a dependency relationship between data comprised in a corresponding loop structure, an intermediate representation code corresponding to the corresponding loop structure.

14. The scheduling method of claim 10, wherein the scheduling of the instructions comprises scheduling the instructions based on a list scheduling algorithm.

15. The scheduling method of claim 10, wherein the allocating of the resources of the hardware comprises allocating data, to a memory, corresponding to instructions included in the selected intermediate representation codes based on a linear allocator.

16. The scheduling method of claim 10, wherein the input specification file of the hardware comprises information associated with a structure of a computing array of the hardware included in the apparatus.

17. The scheduling method of claim 10, wherein the neural network computation comprises a convolutional operation performed by a convolutional layer of a convolutional neural network (CNN).

18. The scheduling method of claim 10, wherein the hardware comprises a convolutional neural network (CNN) accelerator configured to perform a convolutional operation.

19. A non-transitory computer-readable storage medium storing instructions that, when executed by a processor, cause the processor to perform the scheduling method of claim 10.

* * * * *